United States Patent
Kao

(10) Patent No.: US 11,256,444 B2
(45) Date of Patent: Feb. 22, 2022

(54) METHOD FOR PROCESSING READ/WRITE DATA, APPARATUS, AND COMPUTER READABLE STORAGE MEDIUM THEREOF

(71) Applicant: HON HAI PRECISION INDUSTRY CO., LTD., New Taipei (TW)

(72) Inventor: Yi-Lang Kao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/039,669

(22) Filed: Sep. 30, 2020

(65) Prior Publication Data

US 2022/0011971 A1 Jan. 13, 2022

(30) Foreign Application Priority Data

Jul. 10, 2020 (CN) .......................... 202010664093.3

(51) Int. Cl.
*G06F 3/06* (2006.01)

(52) U.S. Cl.
CPC .......... *G06F 3/0659* (2013.01); *G06F 3/0604* (2013.01); *G06F 3/0611* (2013.01); *G06F 3/0629* (2013.01); *G06F 3/0673* (2013.01)

(58) Field of Classification Search
CPC .... G06F 3/0659; G06F 3/0604; G06F 3/0611; G06F 3/0629; G06F 3/0673
See application file for complete search history.

(56) References Cited

U.S. PATENT DOCUMENTS

| | | | |
|---|---|---|---|
| 6,356,485 B1 * | 3/2002 | Proebsting | G11C 7/065 365/189.16 |
| 6,385,708 B1 | 5/2002 | Stracovsky et al. | |
| 6,877,077 B2 * | 4/2005 | McGee | G06F 13/1642 710/39 |
| 7,870,351 B2 * | 1/2011 | Resnick | G06F 13/1673 711/155 |
| 9,361,236 B2 * | 6/2016 | Tune | G06F 12/0846 |
| 2021/0200470 A1 * | 7/2021 | Chan | G06F 3/0619 |

FOREIGN PATENT DOCUMENTS

| | | |
|---|---|---|
| CN | 1383511 A | 12/2002 |
| CN | 106610816 A | 5/2017 |

* cited by examiner

*Primary Examiner* — Idriss N Alrobaye
*Assistant Examiner* — Richard B Franklin
(74) *Attorney, Agent, or Firm* — ScienBiziP, P.C.

(57) ABSTRACT

A method for processing data read/write includes receiving a data read/write request. The data read/write request includes a command type, data, an address, a resource identifier, and a priority level. If the read/write request is the read request, determining whether the read request meets a first placement rule, the first rule being that the address of the read request is different from any and all write request addresses in the write command queue. If the first placement rule is not satisfied, the data stored in the conflicting (i.e., duplicated) address of the write request in the write command queue is acquired as the read data. A data read/write processing apparatus and a computer readable medium related to the data read/write processing method are also disclosed.

15 Claims, 3 Drawing Sheets

METHOD FOR PROCESSING READ/WRITE DATA, APPARATUS, AND COMPUTER READABLE STORAGE MEDIUM THEREOF

FIELD

The subject matter herein generally relates to data processing.

BACKGROUND

Storage mediums receive read/write requests from a processor or other source and acquire data to transmit to the processor or the other source. The storage medium includes a read command queue and a write command queue. Command requests in the read command queue and the write command queue are arranged based on time of receipt or priority level. When any one of the read command requests and any one of the write command requests correspond to a same address in the storage medium, the read command request is executed before the write command request, thus there is a delay in data reading.

Thus, there is room for improvement in the art.

BRIEF DESCRIPTION OF THE FIGURES

Implementations of the present disclosure will now be described, by way of example only, with reference to the attached figures.

DETAILED DESCRIPTION

Figure 1:
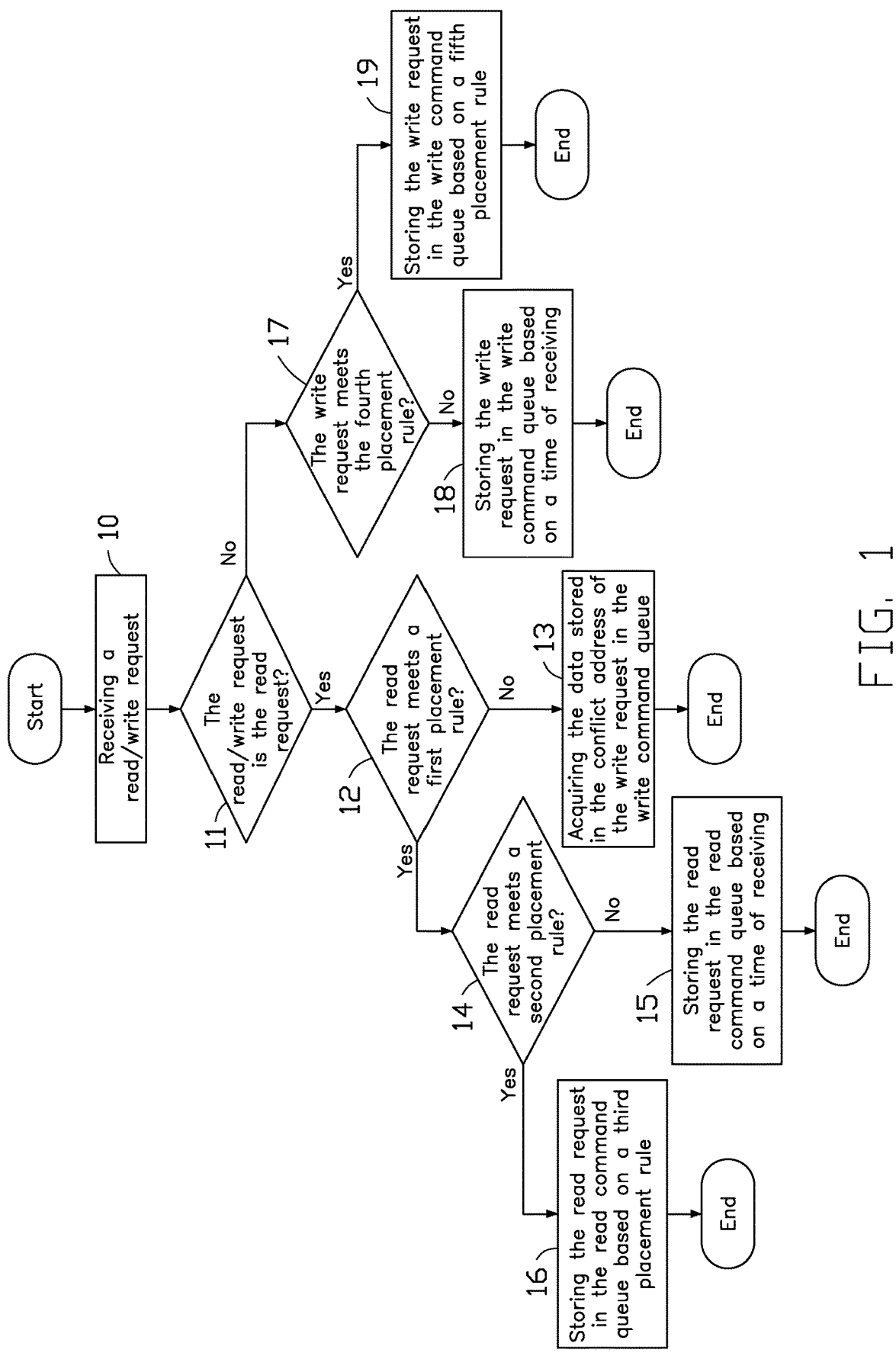
FIG. 1 is a flowchart illustrating an embodiment of a method for processing read/write data.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The present disclosure provides a method for processing read/write data.

Figure 2:
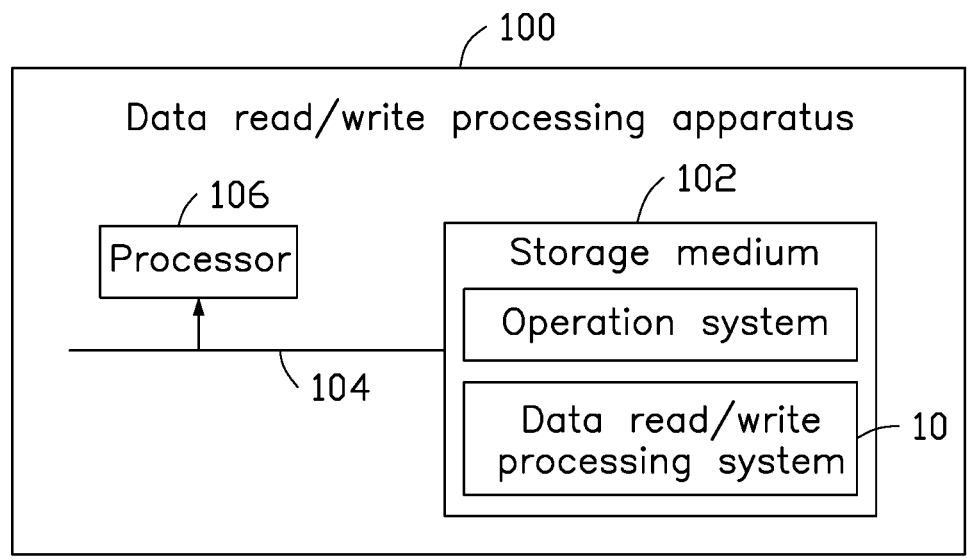
FIG. 2 is a diagram illustrating an embodiment of a data read/write processing apparatus.

FIG. 1 shows a flowchart of a method for the above. In one embodiment, the method for processing read/write data is used in a data read/write processing apparatus 100 (as shown in FIG. 2). The data read/write processing apparatus 100 includes a processor 106 and a storage medium 102. The storage medium 102 includes a read command queue holding read requests and a write command queue holding write requests. The method may comprise at least the following blocks, which also may be applied in a different order:

In block 10, a read/write request is received.

In one embodiment, the data read/write request can include a command type, data, an address, a resource identifier, and a priority level. In at least one embodiment, the data read/write request can be generated by the processor 106.

In block 11, whether the read/write request is a read request is determined.

In block 12, when the data read/write request is a read request, determining whether the read request meets a first placement rule.

In one embodiment, the first placement rule is that the address of the read request is different from an address of each write request in the write command queue.

In block 13, when the read request does not meet the first placement rule (that is, the requested read address is in conflict with a write request for the same address, such address being referred to as "conflict address"), the data stored in the conflict address is directly acquired as a read data.

In block 14, if the data read/write request meets the first placement rule, determining whether the read request meets a second placement rule.

In one embodiment, the second placement rule is that the resource identifier of the read request is different from a resource identifier in any write request in the write command queue.

In block 15, if the read request is not satisfied the second placement rule, the read request is stored in the read command queue based on a time of receiving.

In block 16, if the read request meets the second placement rule, the read request is stored in the read command queue based on a third placement rule.

In one embodiment, the third placement rule is that the read request is inserted in the read command queue based on the priority level.

In block 17, when the read/write command is a write request, a determination is made as to whether the write request meets a fourth placement rule.

In one embodiment, the fourth placement rule is that the address and the resource identifier of the write request is different from an address and a resource identifier in any read request in the read command queue.

In block 18, if the write request does not meet the fourth placement rule, the write request is stored in the write command queue based on a time of receiving.

In block 19, if the write request meets the fourth placement rule, the write request is stored in the write command queue based on a fifth placement rule.

In one embodiment, the fifth placement rule is that the write request is inserted in the write command queue based on the priority level.

Each of the first to fifth placement rules corresponds to a state identifier. The state identifier can be set to enabled or disabled. When the state identifier is enabled, the corresponding placement rule is active, and when state identifier is disabled, the corresponding placement rule is disabled.

The above method compares the address of the read request with the address of the write request in the write command queue, and when there is a conflict address, the read request takes read data directly from the write request addressed to the same conflict address. A read delay is thus reduced, and the consistency of the data is improved. Further, a processing efficiency of the read/write request is optimized by detecting the conflict address, the resource identifier conflict, and the data conflict. Further, the several placement rules can be enabled or disabled according to requirements. When the second placement rule is enabled, the read request or the write request is placed based on the time of receiving, and therefore the priority level of the read request or the write request does not affect the manner of placement, therefore, the consistency of the data is further improved.

Figure 3:
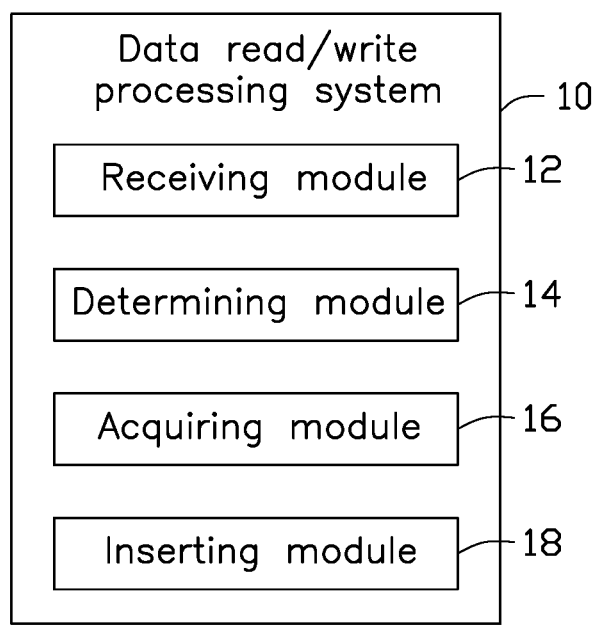
FIG. 3 is a diagram illustrating an embodiment of a data read/write processing system.

Referring to FIG. 2, an embodiment of the data read/write processing apparatus 100 is shown. FIG. 3 shows an embodiment of the data read/write processing system 10. The data read/write processing apparatus 100 is a device with a networking function. The data read/write processing apparatus 100 can be a mobile device, such as a personal computer, a tablet computer, a mobile phone, a personal digital assistant (PDA), a game machine, an Internet protocol television (IPTV), a smart wearable device, a navigation device, and so on. The data read/write processing apparatus 100 can also be a fixed device, such as a desktop computer, a digital television, and so on. The data read/write processing apparatus 100 includes a storage medium 102, a communication bus 104, and a processor 106.

The storage medium 102 stores program codes. The storage medium 102 can be non-physical storage circuits in an embedded circuit, or a physical storage, such as a memory, a transflash card, a smart media card, a secure digital card, a flash card, and so on. The storage medium 102 communicates with the processor 106 through the communication bus 106. The storage medium 102 can include an operating system and a data read/write processing system 10. The operating system includes programs for managing and controlling hardware and software of the data read/write processing apparatus 100 and supports an operation of the data read/write processing apparatus 100 and other programs.

The processor 106 can include one or more microprocessors and digital processors. The processor 106 can invoke program codes in the storage medium 102 to execute corresponding function. For example, the modules in the FIG. 3 are program codes stored in the storage medium 102, and can be executed by the processor 106, for implementing a data read/write processing method. The processor 106 is a central processing unit, which is a large scale integrated circuit. The processor 106 is a calculating core and a control unit.

In one embodiment, the data read/write processing system 10 includes one or more modules being implemented by the processor 106, to execute a data read/write function.

In one embodiment, the data read/write processing system 10 includes:

A receiving module 12 which can receive a data read/write request.

In one embodiment, the data read/write request can include a command type, data, an address, a resource identifier, and a priority level. In at least one embodiment, the data read/write request can be generated by a processor 106.

A determining module 14 which can determine whether the read/write request is the read request. When the read/write request is the read request, the determining module 14 further determines whether the read request meets the first placement rule.

In one embodiment, the first placement rule is that the address of the read request is different from an address of each write request in the write command queue.

An acquiring module 16 which can acquire as read data the data stored in a conflict address of the write request in the write command queue when the read request does not meet the first placement rule.

The determining module 14 further determines whether the read request meets the second placement rule when the data read/write request meets the first placement rule.

In one embodiment, the second placement rule is that the resource identifier of the read request is different from a resource identifier of any of the write requests in the write command queue.

An inserting module 18 which can store the read request in the read command queue based on a time of receiving when the read request does not meet the second placement rule.

The inserting module 18 further stores the read request in the read command queue based on the third placement rule when the read request does meet the second placement rule.

In one embodiment, the third placement rule is that the read request is inserted in the read command queue based on the priority level.

The determining module 14 further determines whether the write request meets the fourth placement rule when the read/write command is the write request.

In one embodiment, the fourth placement rule is that the address and the resource identifier of the write request is different from an address and a resource identifier in any read request in the read command queue.

When the write request does not meet the fourth placement rule, the inserting module 18 further stores write request in the write command queue based on a time of receiving.

When the write request meets the fourth placement rule, the inserting module 18 further stores the write request in the write command queue based on a fifth placement rule.

In one embodiment, the fifth placement rule is that the write request is inserted in the write command queue based on the priority level.

Each of the first to fifth placement rules corresponds to a state identifier. The state identifier can be enabled or disabled. When the state identifier is enabled, the corresponding placement rule is active, and when state identifier is disabled, the corresponding placement rule is disabled.

By comparing the address of the read request with the address of the write request in the write command queue, if there is a conflict address, the read request takes data, as read data, directly from the write request with the same conflict address, thus a read delay is reduced, and the consistency of the data is improved. Further, a processing efficiency of the read/write request is optimized by detecting the conflict address, the resource identifier conflict, and the data conflict. Further, there are several placement rules which can be enabled or disabled as required. When the second placement rule is enabled, the read request or the write request is placed based on the time of receiving, the priority level of the read request or the write request does not affect the placing manner, therefore, the consistency of the data is further improved.

The present disclosure further provides a computer readable medium. The computer readable medium stores computer instructions. The computer instructions are stored in the storage medium 102 and are implemented by the processor 106 to achieve a data read/write processing method as recited in blocks 10-19 of FIG. 1.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A method for processing read/write data in a data read/write processing apparatus, the data read/write processing apparatus comprises a storage medium and a processor; the storage medium stores instructions being executed by the processor to implement following steps:

receiving a data read/write request; the data read/write request comprises a request type, data, an address, and a resource identifier;

determining whether the read/write request is a read request;

determining whether the read request meets a first placement rule, when the read/write request is the read request; the first placement rule is that an address of the read request is different from an address in any write request in a write command queue;

acquiring data stored in a conflict address of the write request in the write command queue as a read data when the read request does not to meet the first placement rule;

determining whether the read request meets a second placement rule when the data read/write request meets the first placement rule; the second placement rule is that the resource identifier of the read request is different from the resource identifier in any write request in the write command queue; and storing the read request in a read command queue based on a time of receiving when the read request does not to meet the second placement rule.

2. The method of claim 1, wherein the data read/write request further comprises a priority level; the method further comprises:

storing the read request in the read command queue based on a third placement rule when the read request meets the second placement rule; the third placement rule is that the read command queue is inserted in the read command queue based on the priority level.

3. The method of claim 2, wherein the method further comprises:

determining whether the write request meets a fourth placement rule when the data read/write request is a write request; the fourth placement rule is that the address and the resource identifier of the write request are different from an address and a resource identifier in any read request in the read command queue; and storing the write request in a write command queue based on a time of receiving when the write request does not to meet the fourth placement rule.

4. The method of claim 3, wherein the method further comprises:

storing the write request in the write command queue based on a fifth placement rule when the write request meets the fourth placement rule; the fifth placement rule is that the write request is inserted in the write command queue based on the priority level.

5. The method of claim 4, wherein each first to fifth placement rules correspond a state identifier; the state identifier can be set to enabled or to disabled; when the state identifier is enabled, the corresponding placement rule is active, and when state identifier is disabled, the corresponding placement rule is disabled.

6. A data read/write processing apparatus; the data read/write processing apparatus comprising a non-transitory storage medium; the non-transitory storage medium storing program codes being executed by a processor, which forms modules; the modules comprising:

a receiving module, configured to receive a data read/write request; the data read/write request comprises a request type, data an address, and a resource identifier;

a determining module, configured to determine whether the read/write request is the read request; the determining module further determines whether the read request meets a first placement rule; the first placement rule is that the address of the read request is different from an address of each write request in the write command queue;

an acquiring module, configured to acquire the data stored in a conflict address of the write request in the write command queue as a read data when the read request does not to meet the first placement rule; and an inserting module;

wherein the data read/write request comprises a resource identifier; the determining module further determines whether the read request meets a second placement rule when the data read/write request meets the first placement rule; the second placement rule is that the resource identifier of the read request is different from the resource identifier in any write request in the write command queue; when the read request does not to meet the second placement rule, the inserting module stores the read request in a read command queue based on a time of receiving.

7. The data read/write processing apparatus of claim 6, wherein the data read/write request further comprises a priority level; when the read request meets the second placement rule, the inserting module stores the read request in the read command queue based on a third placement rule; the third placement rule is that the read request is inserted in the read command queue based on the priority level.

8. The data read/write processing apparatus of claim 7, wherein the determining module further determines whether the write request meets a fourth placement rule when the data read/write request is a write request; the fourth placement rule is that the address and the resource identifier of the write request are different from an address and a resource identifier in any read request in the read command queue; when the write request does not to meet the fourth placement rule, the inserting module stores the write request in a write command queue based on a time of receiving.

9. The data read/write processing apparatus of claim 8, wherein the inserting module further stores the write request in the write command queue based on a fifth placement rule;

the fifth placement rule is that the write request is inserted in the write command queue based on the priority level.

10. The data read/write processing apparatus of claim 9, wherein each first to fifth placement rules correspond a state identifier; the state identifier can be set to enabled or to disabled; when the state identifier is enabled, the corresponding placement rule is active, and when state identifier is disabled, the corresponding placement rule is disabled.

11. A non-transitory computer readable medium storing instructions being executed by a processor to implement following steps:
   receiving a data read/write request; the data read/write request comprises a request type, data an address, and a resource identifier;
   determining whether the read/write request is a read request;
   determining whether the read request meets a first placement rule, when the read/write request is the read request; the first placement rule is that an address of the read request is different from an address in any write request in a write command queue;
   acquiring data stored in a conflict address of the write request in the write command queue as a read data when the read request does not to meet the first placement rule;
   determining whether the read request meets a second placement rule when the data read/write request meets the first placement rule; the second placement rule is that the resource identifier of the read request is different from the resource identifier in any write request in the write command queue; and
   storing the read request in a read command queue based on a time of receiving when the read request does not to meet the second placement rule.

12. The computer readable medium of claim 11, wherein the data read/write request further comprises a priority level; the computer readable medium further comprises:
   storing the read request in the read command queue based on a third placement rule when the read request meets the second placement rule; the third placement rule is that the read request is inserted in the read command queue based on the priority level.

13. The computer readable medium of claim 12, wherein the computer readable medium further comprises:
   determining whether the write request meets a fourth placement rule when the data read/write request is a write request; the fourth placement rule is that the address and the resource identifier of the write request are different from an address and a resource identifier in any read request in the read command queue; and
   storing the write request in a write command queue based on a time of receiving when the write request does not to meet the fourth placement rule.

14. The computer readable medium of claim 13, wherein the computer readable medium further comprises:
   storing the write request in the write command queue based on a fifth placement rule when the write request meets the fourth placement rule; the fifth placement rule is that the write request is inserted in the write command queue based on the priority level.

15. The computer readable medium of claim 14, wherein each first to fifth placement rules correspond a state identifier; the state identifier can be set to enabled or to disabled; when the state identifier is enabled, the corresponding placement rule is active, and when state identifier is disabled, the corresponding placement rule is disabled.

* * * * *